United States Patent

Fujiwara

(10) Patent No.: US 9,097,581 B2
(45) Date of Patent: Aug. 4, 2015

(54) PYROELECTRIC INFRARED DETECTING DEVICE, AND METHOD FOR REPLACING PYROELECTRIC ELEMENT IN PYROELECTRIC INFRARED DETECTING DEVICE

(75) Inventor: Shigemi Fujiwara, Sendai (JP)

(73) Assignee: NEC TOKIN CORPORATION, Sendai-shi, Miyagi (JP)

( * ) Notice: Subject to any disclaimer, the term of this patent is extended or adjusted under 35 U.S.C. 154(b) by 150 days.

(21) Appl. No.: 13/825,798

(22) PCT Filed: Sep. 20, 2011

(86) PCT No.: PCT/JP2011/071329
§ 371 (c)(1),
(2), (4) Date: May 31, 2013

(87) PCT Pub. No.: WO2012/039374
PCT Pub. Date: Mar. 29, 2012

(65) Prior Publication Data
US 2013/0234026 A1   Sep. 12, 2013

(30) Foreign Application Priority Data
Sep. 24, 2010   (JP) ................. 2010-213760

(51) Int. Cl.
G01J 5/34 (2006.01)
G01J 5/02 (2006.01)
G01J 1/04 (2006.01)

(52) U.S. Cl.
CPC ............... *G01J 5/34* (2013.01); *G01J 1/0403* (2013.01); *G01J 5/023* (2013.01); *G01J 5/024* (2013.01); *G01J 5/0205* (2013.01); *G01J 5/0225* (2013.01)

(58) Field of Classification Search
CPC ........................................ G01J 5/34
USPC ................... 250/338.3, 349; 445/2
See application file for complete search history.

(56) References Cited

U.S. PATENT DOCUMENTS 4,542,294 A * 9/1985 Tamura et al. ............ 250/338.3
5,423,931 A   6/1995 Inoue et al.
(Continued)

FOREIGN PATENT DOCUMENTS

CN   1085012 A   4/1994
CN   1144331 A   3/1997
(Continued)

OTHER PUBLICATIONS

International Search Report (with English translation) issued on Nov. 8, 2011, in International Application No. PCT/JP2011/071329.
(Continued)

*Primary Examiner* — David Porta
*Assistant Examiner* — Meenakshi Sahu
(74) *Attorney, Agent, or Firm* — Holtz, Holtz, Goodman & Chick PC

(57) ABSTRACT

While conductive adhesives 60 are provided between element electrodes of a pyroelectric element 10 and board electrodes of an installation board 20, the conductive adhesives 60 are hardened to connect between the element electrodes of the pyroelectric element 10 and the board electrodes of the installation board 20. The conductive adhesives 60 include epoxy resin and, after hardened, have 4B to 7H, both inclusive, of pencil hardness as their hardness on JIS K 5600-5-4 (ISO 15184) standard basis. If the pyroelectric element 10 is broken down, the hardened conductive adhesives 60 are impacted or are cut by using a cutter to take off the pyroelectric element 10 from the installation board 20.

8 Claims, 8 Drawing Sheets

(56) References Cited

U.S. PATENT DOCUMENTS

| | | | |
|---|---|---|---|
| 6,186,848 B1* | 2/2001 | Yotsumoto et al. | 445/2 |
| 2002/0175285 A1* | 11/2002 | Ito et al. | 250/338.3 |
| 2005/0279939 A1* | 12/2005 | Yoshida et al. | 250/332 |
| 2009/0050808 A1* | 2/2009 | Ushimi et al. | 250/338.3 |
| 2010/0183887 A1* | 7/2010 | Krienke | 428/447 |

FOREIGN PATENT DOCUMENTS

| | | | |
|---|---|---|---|
| EP | 0 736 911 A2 | | 10/1996 |
| JP | 06-331438 A | | 12/1994 |
| JP | 07-092025 A | | 4/1995 |
| JP | 07092025 | * | 4/1995 |
| JP | 08-278196 A | | 10/1996 |
| JP | 09-126879 A | | 5/1997 |
| JP | 10-038679 A | | 2/1998 |
| JP | 11-064105 A | | 3/1999 |
| JP | 2001-304957 A | | 10/2001 |
| JP | 2003-069378 A | | 3/2003 |
| JP | 2008-268052 A | | 11/2008 |
| JP | 2010-169520 A | | 8/2010 |
| WO | WO 2007/129547 A1 | | 11/2007 |

OTHER PUBLICATIONS

Chinese Office Action dated Aug. 21, 2014 issued in counterpart Chinese Application No. 201180045041.7.

Japanese Office Action dated Mar. 5, 2015, issued in counterpart Japanese Application No. 2012-535028.

Taiwanese Office Action dated Mar. 4, 2015, issued in counterpart Taiwanese Application No. 100134207.

* cited by examiner

PYROELECTRIC INFRARED DETECTING DEVICE, AND METHOD FOR REPLACING PYROELECTRIC ELEMENT IN PYROELECTRIC INFRARED DETECTING DEVICE

TECHNICAL FIELD

This invention relates to a pyroelectric type infrared detection device, in which a temperature detection element (pyroelectric element) with pyroelectric effect is mounted, and to a replacement method of a pyroelectric element in the pyroelectric type infrared detection device.

BACKGROUND ART

For example, Patent Document 1 discloses a pyroelectric type infrared detection device which includes a case member having two pyroelectric elements therein and two lenses condensing infrared lights into the two pyroelectric elements.

Patent Document 2 discloses a pyroelectric type infrared detection device with a structure where a pyroelectric element is mounted on a circuit board. In a pyroelectric type infrared detection device of Patent Document 2, electrodes of the pyroelectric element and other electrodes of the circuit board are electrically connected by hardened conductive adhesives. Hardness of the hardened conductive adhesive is 5 B to 6 B of pencil hardness. The hardened conductive adhesives used in Patent Document 2 are soft.

PRIOR ART DOCUMENTS

Patent Document(s)

Patent Document 1: JP 2008-268052 A
Patent Document 2: JP H 10-38679 A

DISCLOSURE OF INVENTION

Problems to be Solved by Invention

If a pyroelectric element included in a pyroelectric type infrared detection device is failed, the failed pyroelectric element should be replaced.

It is an object of the present invention to provide a pyroelectric type infrared detection device which allows easy replacement of a pyroelectric element.

Means for Solving the Problems

One aspect of the present invention provides a pyroelectric type infrared detection device which includes a pyroelectric element and an installation board. The pyroelectric element comprises a pyroelectric board formed of a plate-like pyroelectric member and element electrodes. The pyroelectric board has an upper surface and a lower surface. The upper surface of the pyroelectric board is a reception surface for receiving an infrared light. The lower surface of the pyroelectric board is formed with the element electrodes. The installation board has another upper surface which is provided with board electrodes. The element electrodes and the board electrodes are connected by hardened conductive adhesives. The conductive adhesives include epoxy resin. The hardened conductive adhesives have 4 B to 7 H, both inclusive, of pencil hardness as their hardness on JIS K 5600-5-4 (ISO 15184) standard basis.

Another aspect of the present invention provides a method of replacement of a pyroelectric element in the above-mentioned pyroelectric infrared detection device. The method comprises steps of: breaking the hardened conductive adhesives to take out the pyroelectric element; removing trace of the conductive adhesives from the board electrodes; and, while interposing new conductive adhesives between element electrodes of new pyroelectric element and the board electrodes, hardening the new conductive adhesives to electrically connected between the element electrodes of the new pyroelectric element and the board electrodes.

Advantageous Effect of Invention

The soft conductive adhesives of Patent Document 2 are much sticker so that it is difficult to take off the pyroelectric element from the circuit board. In addition, the difficulties might cause the board electrodes to be damaged or broken down upon taking off the pyroelectric element from the circuit board.

On the other hand, the hardened conductive adhesives of the present invention have 4 B to 7 H, both inclusive, of pencil hardness. Because of the hardness, impact load is locally applied to the hardened conductive adhesives so that intentional breakage and removal of the hardened conductive adhesives can be easily carried out. Therefore, upon replacement of the pyroelectric element, the pyroelectric element can be taken off without applying undesirable damage to the pyroelectric type infrared detection device.

An appreciation of the objectives of the present invention and a more complete understanding of its structure may be had by studying the following description of the preferred embodiment and by referring to the accompanying drawings.

BEST MODE FOR CARRYING OUT INVENTION

Figure 1:
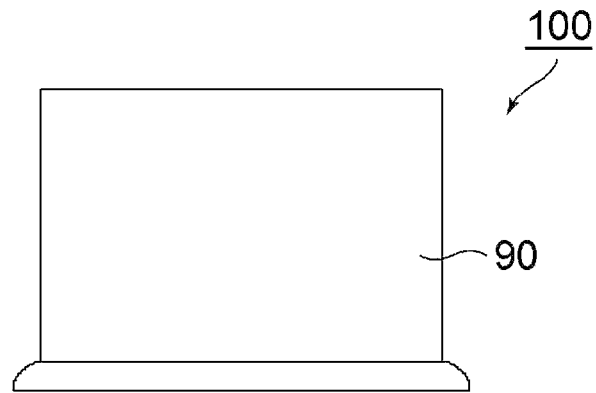
FIG. 1 is an exploded, side view showing a pyroelectric type infrared detection device according to a first embodiment of the present invention.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

[First Embodiment]

With reference to FIG. 1, a pyroelectric type infrared detection device 100 according to a first embodiment of the present invention comprises a pyroelectric element 10 and an installation board 20 as well as a base 70 and a package 90, wherein the pyroelectric element 10 is installed on the installation board 20, the base 70 and the package 90 accommodate the pyroelectric element 10 and the installation board 20.

Figure 2:
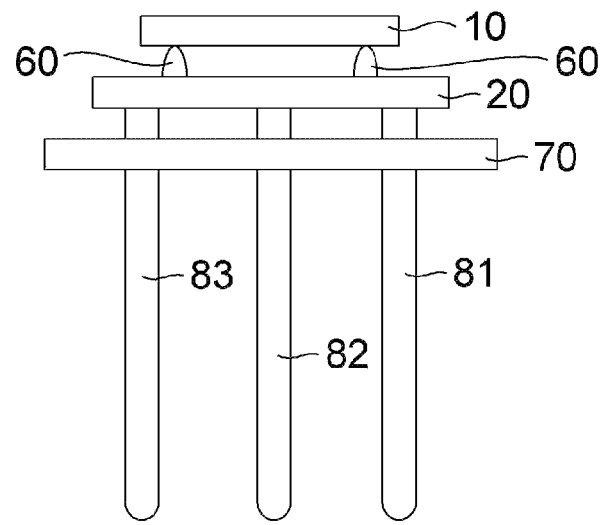
FIG. 2 is a top plan view showing a pyroelectric element included in the pyroelectric type infrared detection device of FIG. 1.
Figure 3:
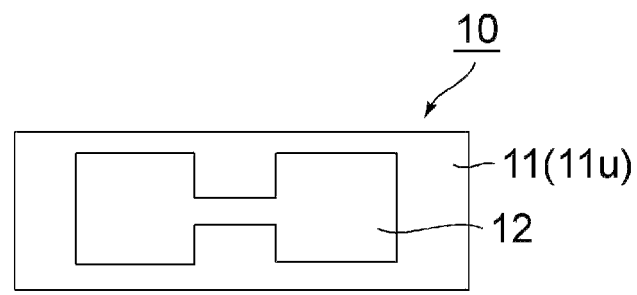
FIG. 3 is a bottom view showing a pyroelectric element of FIG. 2.

As shown in FIGS. 1 to 3, the pyroelectric element 10 according to the present embodiment is an element of dual-type and comprises a pyroelectric board 11, an upper electrode 12 and two lower electrodes (element electrodes) 13, 14, wherein the pyroelectric board 11 has a rectangular shape and is formed of a pyroelectric member, the upper electrode 12 is formed on an upper surface 11u of the pyroelectric board 11, and the lower electrodes 13, 14 are formed on a lower surface 11l of the pyroelectric board 11. Each of the lower electrodes 13, 14 has a quadrate conductive pattern and covers almost left half or right half of the lower surface 11l. The upper electrode 12 has two quadrate conductive patterns and another conductive pattern couple therebetween, wherein the quadrate conductive patterns correspond to the lower electrodes 13, 14. The pyroelectric board 11 is subjected to a polarization process by applying voltage between the upper electrode 12 and the lower electrodes 13, 14 before installation of the pyroelectric board 11 to the installation board 20. When the pyroelectric board 11 absorbs infrared lights, electric charges appear on a surface of the pyroelectric board 11, depending on temperature variation due to the absorption. Therefore, monitoring a voltage variation between the upper electrode 12 and the lower electrodes 13, 14 can detect infrared lights.

The installation board 20 includes a substrate 21, two upper electrodes (board electrodes) 23, 24, lower electrodes 31, 32, 33 and conductive traces 34, 35, 36, 37, wherein the substrate 21 is made of insulator, the upper electrodes 23, 24 are formed on an upper surface 21u of the substrate 21, and the lower electrodes 31, 32, 33 as well as the conductive traces 34, 35, 36, 37 are formed on a lower surface 21l of the substrate 21. On the lower surface 21l of the substrate 21, a field effect transistor (semiconductor amplifier element) 40 is installed. A drain 41 of the field effect transistor 40 is connected to the lower electrode 31 through the conductive trace 34. A gate 42 of the field effect transistor 40 is connected to the upper electrode 23 through the conductive trace 36 and a through-hole 26 piercing the substrate 21. A source 43 of the field effect transistor 40 is connected to the lower electrode 33 through the conductive trace 37. The lower electrode 32 is connected to the upper electrode 24 through the conductive trace 35 and a through-hole 27 piercing the substrate 21.

Figure 4:
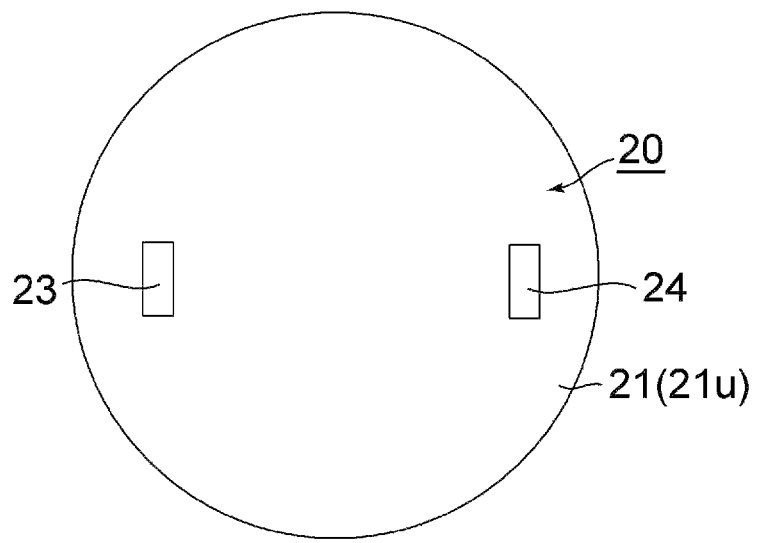
FIG. 4 is a top plan view showing an installation board included in the pyroelectric type infrared detection device of FIG. 1.
Figure 5:
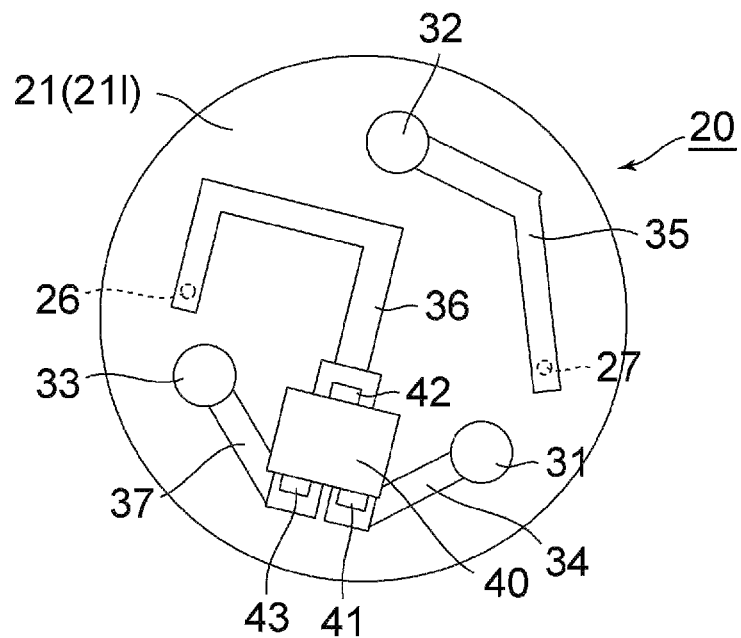
FIG. 5 is a bottom view showing the installation board of FIG. 4.

As understood from FIGS. 1, 3 and 4, the upper electrodes 23, 24 of the installation board 20 and the lower electrodes 13, 14 of the pyroelectric element 10 are connected by using hardened conductive adhesives 60. The conductive adhesives 60 include epoxy resin and, after hardened, have 4 B to 7 H, both inclusive, of pencil hardness as their hardness on JIS K 5600-5-4 (ISO 15184) standard basis. In other words, they are harder in comparison with the conductive adhesives of Patent Document 2. For materials, and so on, of the conductive adhesives 60, detail explanation will be made afterwards.

Figure 6:
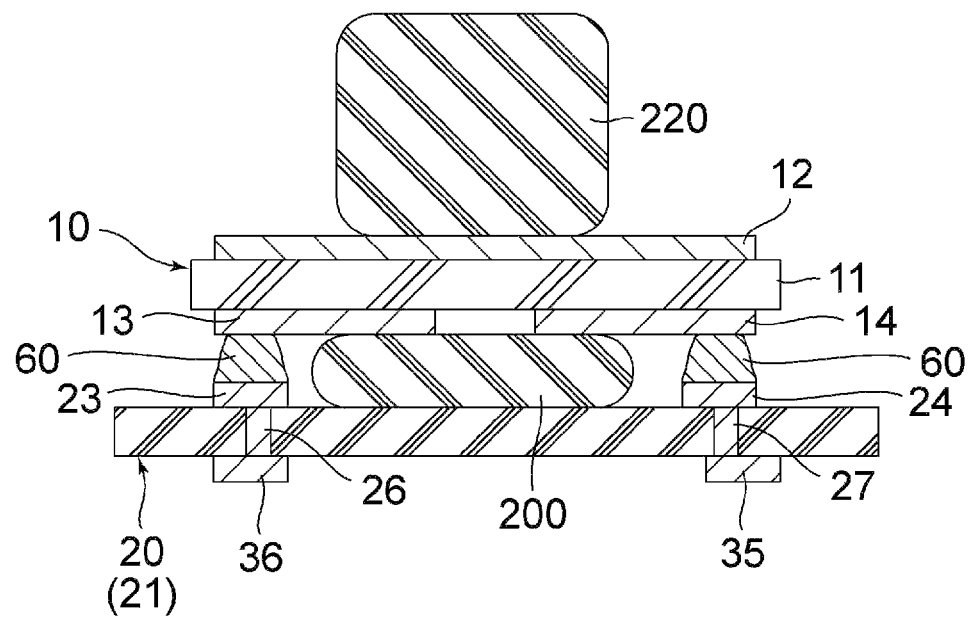
FIG. 6 is a view showing a process for installing the pyroelectric element on the installation board. This view illustrates its cross-section only.

Specifically, the connection with the conductive adhesives 60 are carried out as shown in FIG. 6. First, a spacer 200 is disposed between the upper electrode 23 and the upper electrode 24 of the installation board 20. Next, the conductive adhesives 60 are applied on the upper electrode 23 and the upper electrode 24. Furthermore, the pyroelectric element 10 is arranged above the installation board 20 so that the upper electrodes 23, 24 of the installation board 20 and the lower electrodes 13, 14 of the pyroelectric element 10 face each other in a vertical direction. While the conductive adhesives 60 are interposed between the upper electrodes 23, 24 of the installation board 20 and the lower electrodes 13, 14 of the pyroelectric element 10, a weight 220 is put on the pyroelectric element 10. In detail, the weight 220 is put so that the weight 220 does not protrude from the spacer 200 as viewed transparently of the pyroelectric element 10 from above. Under this condition, the conductive adhesives 60 are hardened through heat treatment, and then the weight 220 and the spacer 200 are removed, so that the installation of the pyroelectric element 10 onto the installation board 20 is completed. As understood from this structure, the pyroelectric element 10 and the installation board 20 are connected to each other only by the conductive adhesives 60, and they are substantially isolated in thermal aspect from each other.

To the lower electrodes 31, 32, 33 of the installation board 20, external connection pins 81, 82, 83 are connected, respectively, by using conductive adhesives such as solder or the like. The installation board 20 is installed on the base 70 so that the external connection pins 81, 82, 83 pierce the base 70. Under inert gas atmosphere, the package 90 and the base 70 are sealed. The reason of sealing under inert gas atmosphere is to prevent humidity from causing variation of characteristics of the pyroelectric element 10 and deterioration of the pyroelectric element 10 as such. Thus, the pyroelectric element 10 and the installation board 20 are accommodated within a space formed between the package 90 and the base 70.

Figure 7:
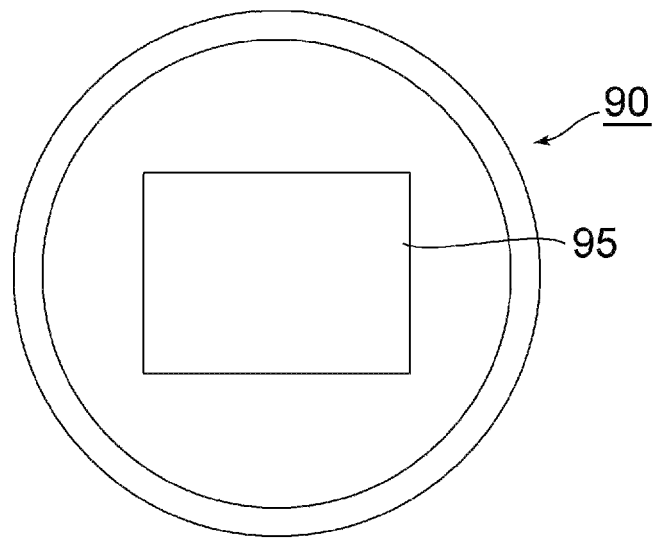
FIG. 7 is a top plan view showing a package of FIG. 1.

As understood from FIG. 7, an optical filter 95 is attached to a center of the upper surface of the package 90, which allows only infrared lights with desired wavelengths to enter into the package 90, depending upon its use such as human detection.

In the pyroelectric type infrared detection device 100 with the above-mentioned structure, the lower electrode 13 of the pyroelectric element 10 is electrically connected to the gate 42 of the field effect transistor 40, the lower electrode 14 of the pyroelectric element 10 is electrically connected to the external connection pin 82, the drain 41 of the field effect transistor 40 is electrically connected to the external connection pin 81, and the source 43 of the field effect transistor 40 is electrically connected to the external connection pin 83. Between the drain 41 and the source 43, a suitable voltage is applied.

In the above-mentioned pyroelectric type infrared detection device 100, entering of infrared lights into the pyroelectric element 10 excites electric charges on one of the lower electrodes 13, 14 of the pyroelectric element 10 so that a voltage caused by the electric charges is applied to the gate 42. Thus, the infrared lights can be detected. On the other hand, if temperature variation, and so on, excites electric charges on the whole pyroelectric element 10, the same voltages appear on the lower electrode 13 and the lower electrode 14 as each other so that the output of the pyroelectric type infrared detection device 100 is not detected. If a high resistance is electrically connected between the gate 42 and the upper electrode 23, the pyroelectric type infrared detection device 100 does not detect undesirable output due to temperature difference within the pyroelectric element 10. To detect human movement, resistance will be set so that its output can be detected at a frequency of about 1 Hz.

As described above, the conductive adhesives 60 according to the present embodiment include epoxy resin and, after hardened, have 4 B to 7 H, both inclusive, of pencil hardness as their hardness on JIS K 5600-5-4 (ISO 15184) standard basis. Use of the aforementioned conductive adhesives 60 allows that, if the pyroelectric element 10 fails, the failing pyroelectric element 10 can be easily taken off by opening the package 90, followed by cutting the conductive adhesives 60 literally by the use of cutter. Furthermore, trace of the conductive adhesives 60 on the upper electrodes 23, 24 of the installation board 20 can be completely removed by pressing with the cutter.

For example, a mixture of an adhesive agent and conductive particles can be used as the aforementioned conductive adhesives 60. As the adhesive agent, a mixture of epoxy resin and hardener or a silicone resin may be used, wherein the epoxy resin is, for example, bisphenol A epoxy resin, bisphenol F epoxy resin or phenol novolac epoxy resin, and the hardener is, for example, an imidazole-based one. As the conductive particles, metal powder particles of copper, silver, nickel, and so on, as well as resin or ceramic powder particles coated with the aforementioned metal may be used. The conductive particles may have various shapes such us a scale shape, a spherical shape and a granular shape.

Especially, the conductive adhesive 60 according to the present embodiment is a mixture of an adhesive agent of about 20 to 40 weight % and conductive particles of about 60 to 80 weight % and, as mentioned above, has 4 B to 7 H, both inclusive, of pencil hardness as its hardness on JIS K 5600-5-4 (ISO 15184) standard basis after hardened. For example, if conductive adhesives "3301", "3301B", "3301 N" manufactured by ThreeBond Co., Ltd. as well as conductive adhesives "CE-3920" manufactured by Emerson & Cuming are thermoset under the condition of 150 C.°×30 minutes, they have 4 B to 7 H, both inclusive, of pencil hardness as their hardness after hardened. On the other hand, if conductive adhesives "3302", "3302B" manufactured by ThreeBond Co., Ltd. are thermoset under the condition of 150° C.×30 minutes, they have their hardness smaller than 4 B of pencil hardness as after hardened.

It is preferable that the conductive adhesives 60 has 3.0 to 3.7, both inclusive, of thixotropy index or structural viscosity ratio, wherein thixotropy index =$\eta 1(0.5$ rpm, $25°$ C.$)/\eta 2(5.0$ rpm, $25°$ C.). If thixotropy index is thus set, a distance between the pyroelectric element 10 and the installation board 20 can be made 0.2 mm or more. Therefore, workability upon removal of the failing pyroelectric element can be improved. In addition, heat transfer due to heat radiation between the pyroelectric element 10 and the installation board 20 can be prevented. Therefore, responsivity of the pyroelectric element 10 for incoming infrared lights can be improved.

Furthermore, it is preferable that conductive adhesives meeting the following condition is selected as the conductive adhesives 60: a difference between thermal expansion coefficient of the conductive adhesives 60 and thermal expansion coefficient of the pyroelectric board 11 is 10% or less of the thermal expansion coefficient of the pyroelectric board 11. If such conductive adhesives 60 are used, stress due to thermal variation can be suppressed.

If human detection is carried out for crime prevention or power saving, a frequency band of signals is around 1 Hz. If a popcorn noise is detected upon such use, the popcorn noise is in a form of pulse which has a width of several milliseconds. Such undesirable popcorn noise can be removed by the use of band-pass filter. However, the hardness of the conductive adhesive 60 after hardened is 7 H or smaller of pencil hardness as in the present embodiment, a popcorn noise is so small that it is hardly recognized.

Although the conductive adhesives 60 are pressed and fixed by the spacer 200 and the weight 220 as shown in FIG. 6 while the conductive adhesives 60 are completely thermoset in the above-mentioned embodiment, the present invention is not limited thereto. For example, the conductive adhesives 60 are pressed and fixed by the spacer 200 and the weight 220 as shown in FIG. 6 while the conductive adhesives 60 are provisionally thermoset under the temperature of around 60° C. Then, the spacer 200 and the weight 220 are removed so that the conductive adhesives 60 are completely hardened. Namely, multi-step curing may be carried out so that stress within the conductive adhesives 60 is relaxed.

[Second Embodiment]

A pyroelectric type infrared detection device according to a second embodiment of the present invention is a modification of the pyroelectric type infrared detection device 100 according to the aforementioned first embodiment. Hereinafter, explanation will be directed only to its difference from the first embodiment with reference to drawings.

Figure 8:
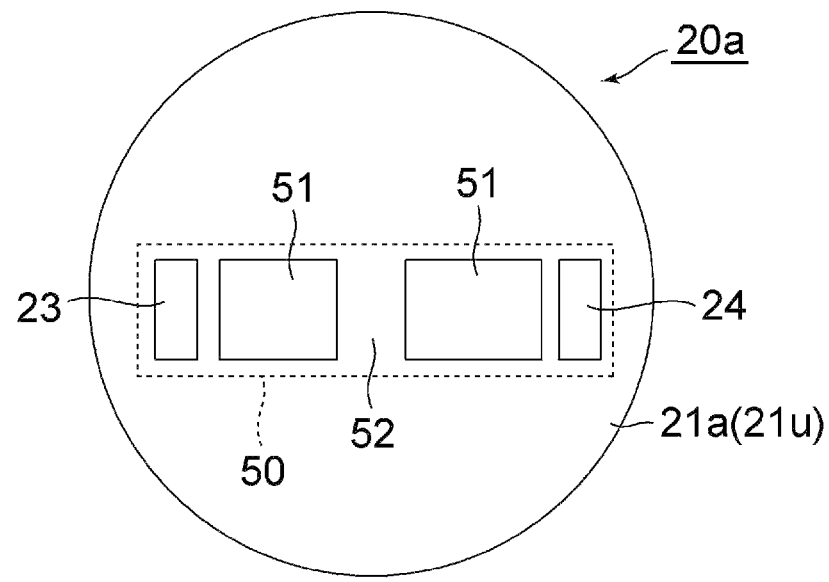
FIG. 8 is a top plan view showing an installation board included in a pyroelectric type infrared detection device according to a second embodiment of the present invention.
Figure 9:
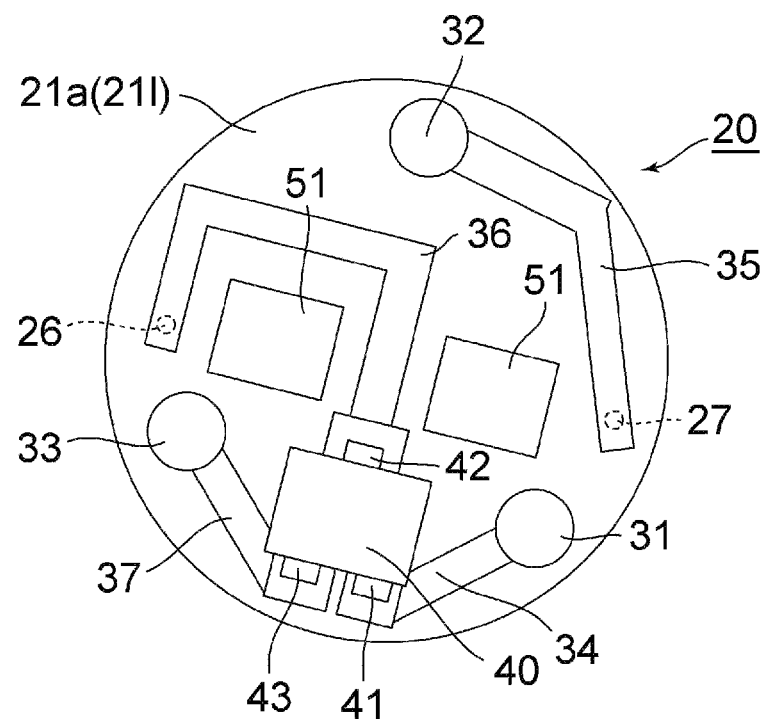
FIG. 9 is a bottom view showing the installation board of FIG. 8.
Figure 10:
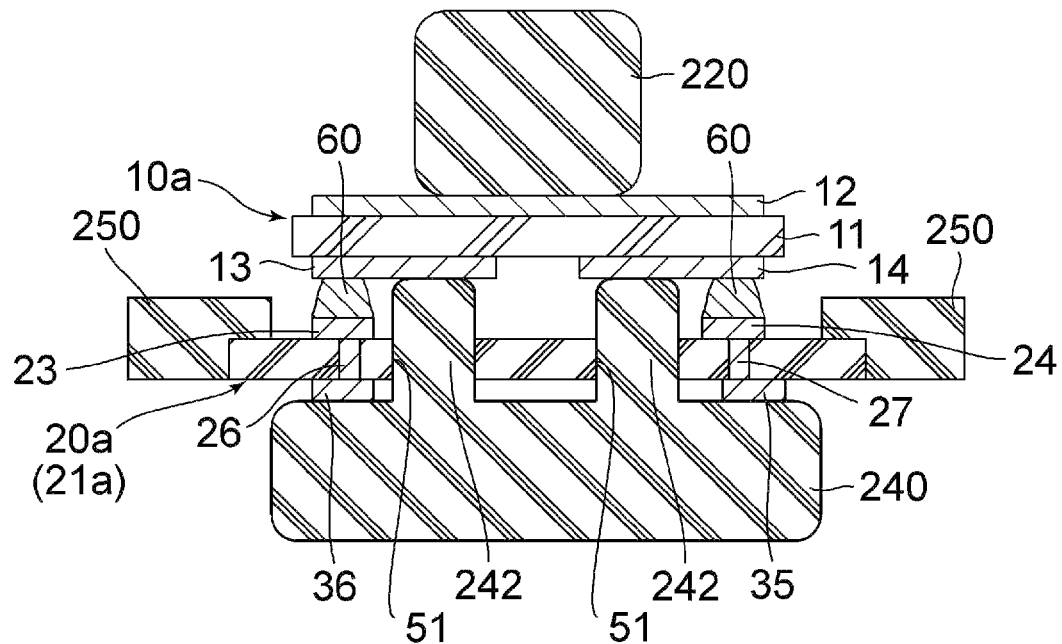
FIG. 10 is a cross-sectional view showing a process for installing the pyroelectric element on the installation board.

The pyroelectric type infrared detection device according to the present embodiment comprises an installation board 20a as shown in FIGS. 8 to 10. The installation board 20a is generally same as the installation board 20 of the first embodiment (See FIGS. 8 and 9) except that the installation board 20a is formed with two piercing-holes 51.

In detail, the piercing-holes 51 are formed within a correspondence region 50 which is a region corresponding to the pyroelectric element 10 in the installation board 20a. In addition, the upper electrodes 23, 24 are located within the correspondence region 50, too. Furthermore, the number of the provided piercing-holes 51 is not one but two, i.e., plural. Between the piercing-holes 51, a beam portion 52 is positioned. The existence of the beam portion 52 enables the installation board 20a to ensure its strength in comparison with the case of formation of a large piercing-hole 51.

The aforementioned provision of the piercing-holes within the correspondence region 50 makes an area size small, wherein the area size is of the installation board 20a facing the pyroelectric element 10 when the pyroelectric element 10 is installed on the installation board 20a. Therefore, heat transfer due to heat radiation from the pyroelectric element 10 to the installation board 20a can be prevented while heat transfer due to heat radiation to the installation board 20 from the pyroelectric element 10 can be prevented. Thus, according to the present embodiment, responsivity of the pyroelectric element 10 for incoming infrared lights can be improved.

In the pyroelectric type infrared detection device 100 according to the aforementioned first embodiment, the spacer 200 is interposed between the pyroelectric element 10 and the installation board 20 upon the hardening of the conductive adhesives 60 (See FIG. 6). On the other hand, the pyroelectric element 10 is installed on the installation board 20a through a different method in the pyroelectric type infrared detection device according to the present embodiment.

Specifically, as shown in FIG. 10, a positioner 240, a control plate 250 and a weight 220 are used, wherein the positioner 240 has two support portions 242 projecting upwards. While the control plate 250 controls edge portions or peripheral portions of the installation board 20a to prevent upward or horizontal movement thereof, the support portions 242 are inserted into the piercing-holes 51, respectively, so that tips or upper ends of the support portions 242 support the lower electrodes 13, 14, respectively. Thus, the positioning of the pyroelectric element 10 for the installation board 20a is carried out. Under this state, the weight 220 is put on the upper electrode 12 of the pyroelectric element 10 while the conductive adhesives 60 are thermoset, so that the pyroelectric element 10 is installed on the installation board 20a. Use of the control plate 250 can prevent rising of the installation board 20a. In addition, even if the conductive adhesives 60 are hardened and shrunk, the positioner 240 can be taken off. Therefore, according to the present embodiment, the conductive adhesives 60 with high cure shrinkage can be used.

Figure 11:
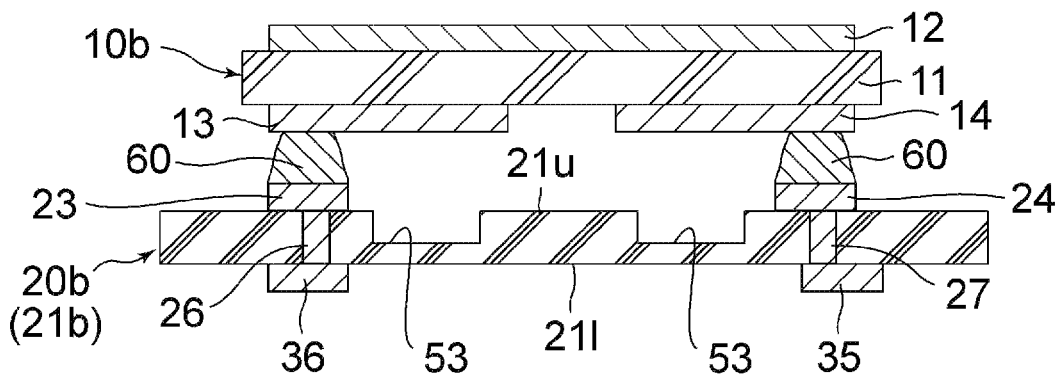
FIG. 11 is a cross-sectional view showing a modification of the pyroelectric type infrared detection device of FIG. 8. Especially, this view illustrates a relation between the installation board and the pyroelectric element.

In addition, if heat transfer due to heat radiation will be prevented although installation method may be same as that of the first embodiment, a substrate 21b of an installation board 20b may be formed with depression portions 53 instead of the piercing-holes 51, as shown in FIG. 11. The depression portions 53 are formed in correspondence regions corresponding to the pyroelectric element 10b and are depressed downwards from the upper surface 21u of the substrate 21b. The structure reduces regions of the pyroelectric element 10 and the installation board 20b facing each other with the minimum distance therebetween, in comparison with that of the first embodiment, so that undesirable heat transfer can be prevented.

[Third Embodiment]

Figure 12:
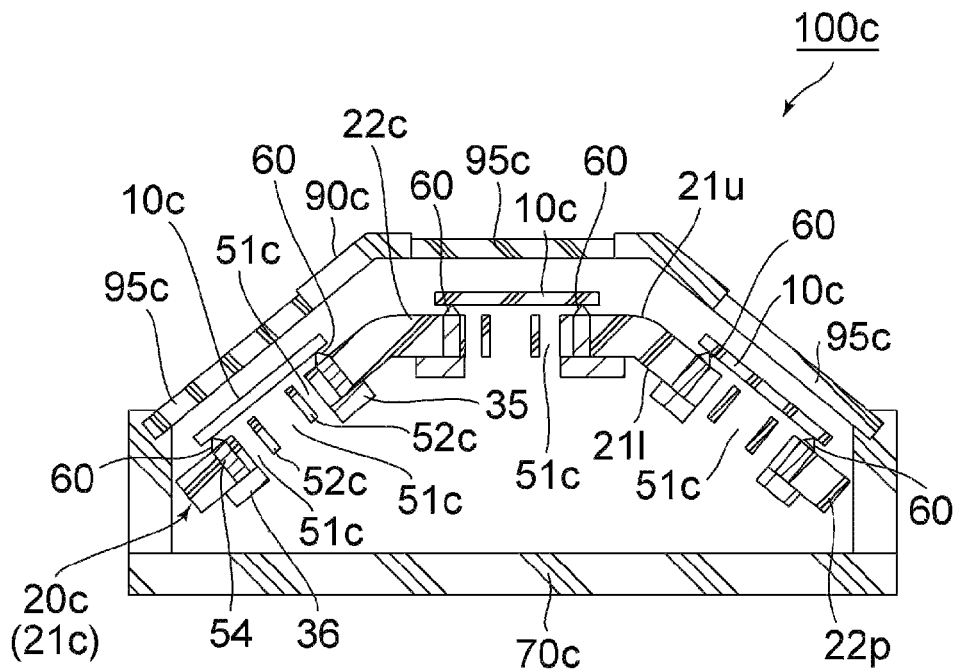
FIG. 12 is a view showing a pyroelectric type infrared detection device according to a third embodiment of the present invention. This view illustrates its cross-section only.
Figure 13:
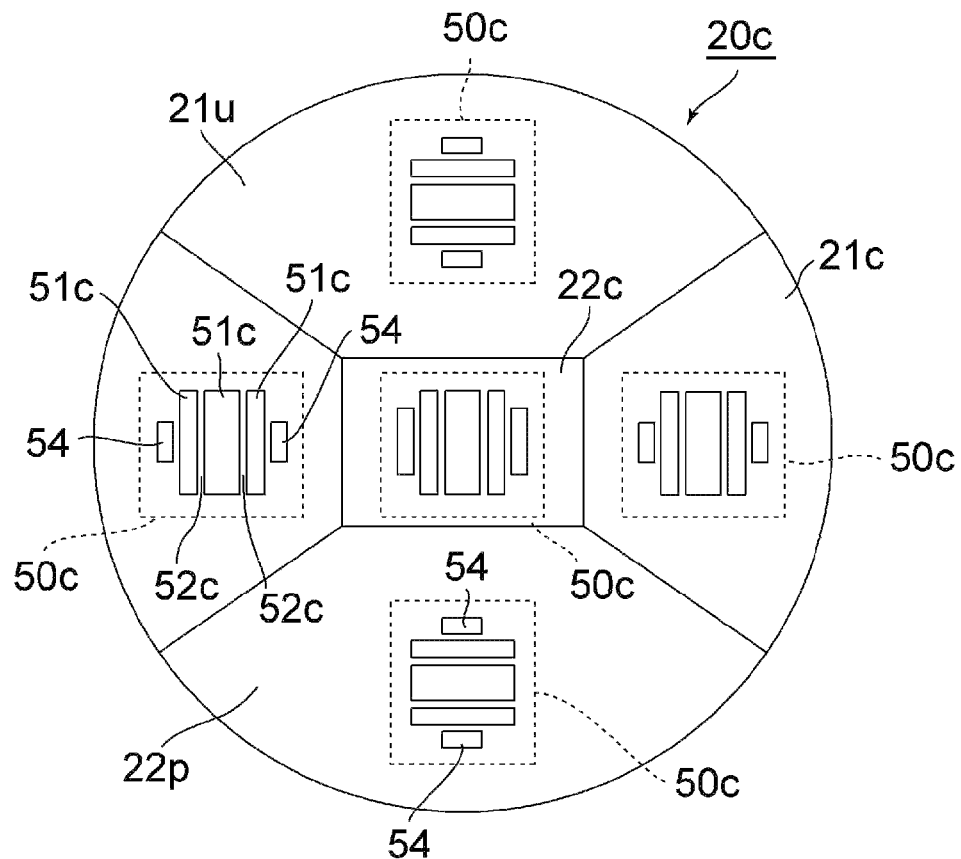
FIG. 13 is a top plan view showing an installation board included in the pyroelectric type infrared detection device of FIG. 12.
Figure 14:
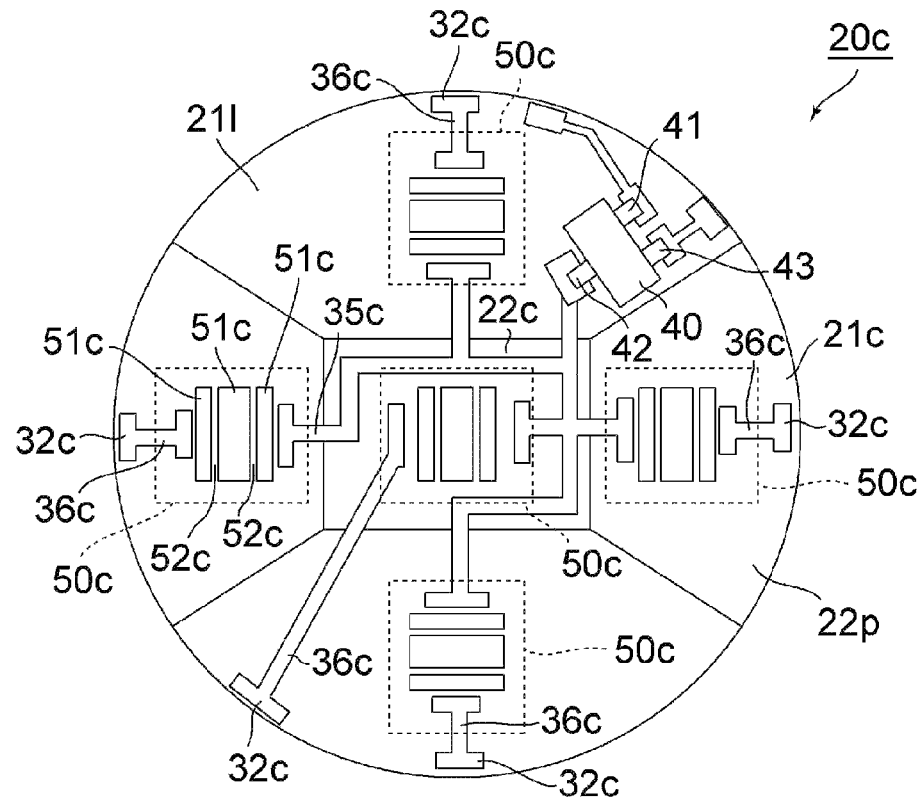
FIG. 14 is a bottom view showing the installation board of FIG. 13.

With reference to FIGS. 12 to 14, a pyroelectric type infrared detection device 100c according to a third embodiment of the present invention is a further modification of the pyroelectric type infrared detection device according to the aforementioned second embodiment. Hereinafter, explanation will be directed only to its difference between the above-mentioned embodiment and the present embodiment, with reference to drawings.

As shown in FIGS. 12 to 14, a plurality of pyroelectric elements 10c are installed on a single installation board 20c in this embodiment.

As apparent from FIG. 12, the installation board 20c has a peripheral section 22p and a central section 22c and has a shape that the central section 22c is raised from the peripheral section 22p. Specifically, the installation board 20c has a domical shape that the central section is swelled upwards.

As understood from FIGS. 12 to 14, on the installation board 20c according to the present embodiment, five pyroelectric elements 10c are installed. As shown in FIGS. 13 and 14, each of correspondence regions 50c corresponding to the respective pyroelectric elements 10c is formed with three, i.e. plural, piercing-holes 51c, and a beam portion 52c is provided between the piercing-holes 51c in each correspondence region 50c. Therefore, undesirable heat transfer between the installation board 20c and each pyroelectric element 10c can be prevented without unintentional degradation of the strength of the installation board 20c.

In the present embodiment, electrodes or traces formed on an upper surface 21u of a substrate 21c and electrodes or traces formed on a lower surface 21l of the substrate 21c are connected to each other with conductive members 54. The conductive members 54 according to the present embodiment are disposed within the substrate 21 upon the molding of the substrate 21 via insert-molding process. However, the present invention is not limited thereto. For example, the conductive members 54 may be constituted by through holes or via holes.

As shown in FIG. 14, a field effect transistor 40 is provided on the lower surface 21l of the substrate 21. As apparent from drawings, one of the electrodes positioned on each correspondence region 50c, which corresponds to one of the element electrodes of each pyroelectric element 10c, is electrically connected to a gate 42 of the field effect transistor 40 through a conductive trace 35c. the other one of the electrodes positioned on each correspondence region 50c, which corresponds to the other one of the element electrodes of each pyroelectric element 10c, is connected to a corresponding lower electrode 32c through a corresponding conductive trace 36c. Namely, one of the electrodes of the pyroelectric elements 10c is connected to the common gate 42. Furthermore, the lower electrodes 32c are connected to each other through members not shown. The structure enables that, when infrared lights enter any one of the pyroelectric elements 10c, the entering can be detected. In addition, the conductive traces and the electrodes on the installation board 20c may be formed through a molded interconnect device (MID) technology.

As shown in FIG. 12, a package 90c has a domical shape in correspondence with the shape of the installation board 20c. A space formed between the package 90c and a base 70c accommodates the above-mentioned installation board 20c and the pyroelectric elements 10c, while the package 90c and the base 70c are sealed off. The package 90c is provided with an optical filter 95c in correspondence with the pyroelectric elements 10c.

The pyroelectric type infrared detection device 100c with the aforementioned structure has no need of condenser lenses which are used for widening its viewing angle in Patent Document 1. In addition, if each one of the pyroelectric elements 10c should be replaced, the other pyroelectric elements 10c are out of the replacement so that the workability upon replacement of the pyroelectric elements 10c is thus improved.

Figure 15:
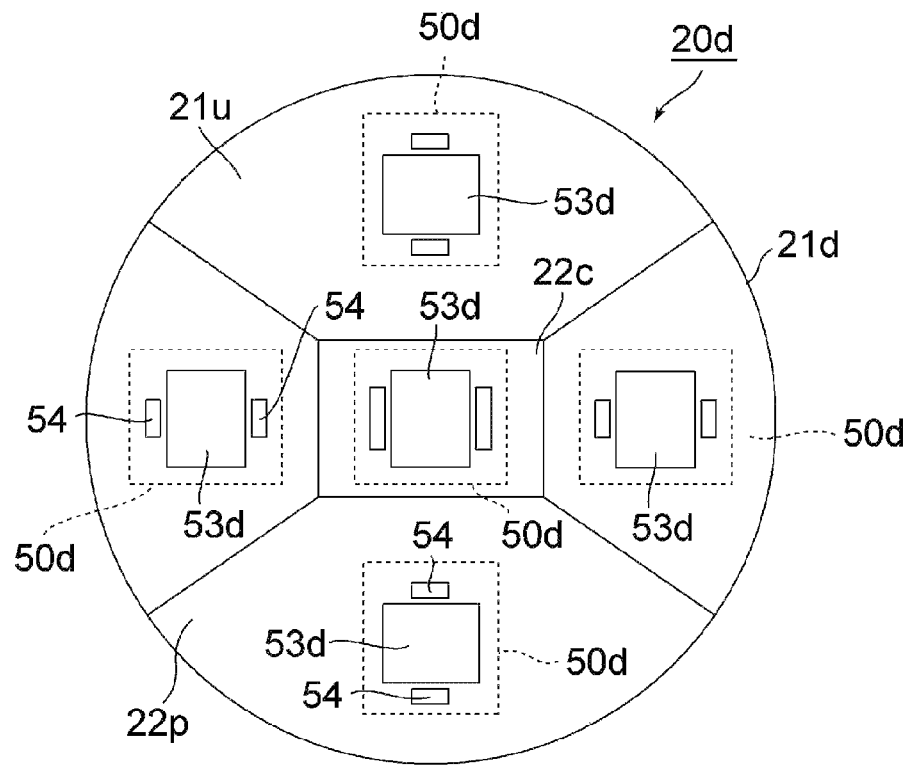
FIG. 15 is a top plan view showing a modification of the installation board of FIG. 12.
Figure 16:
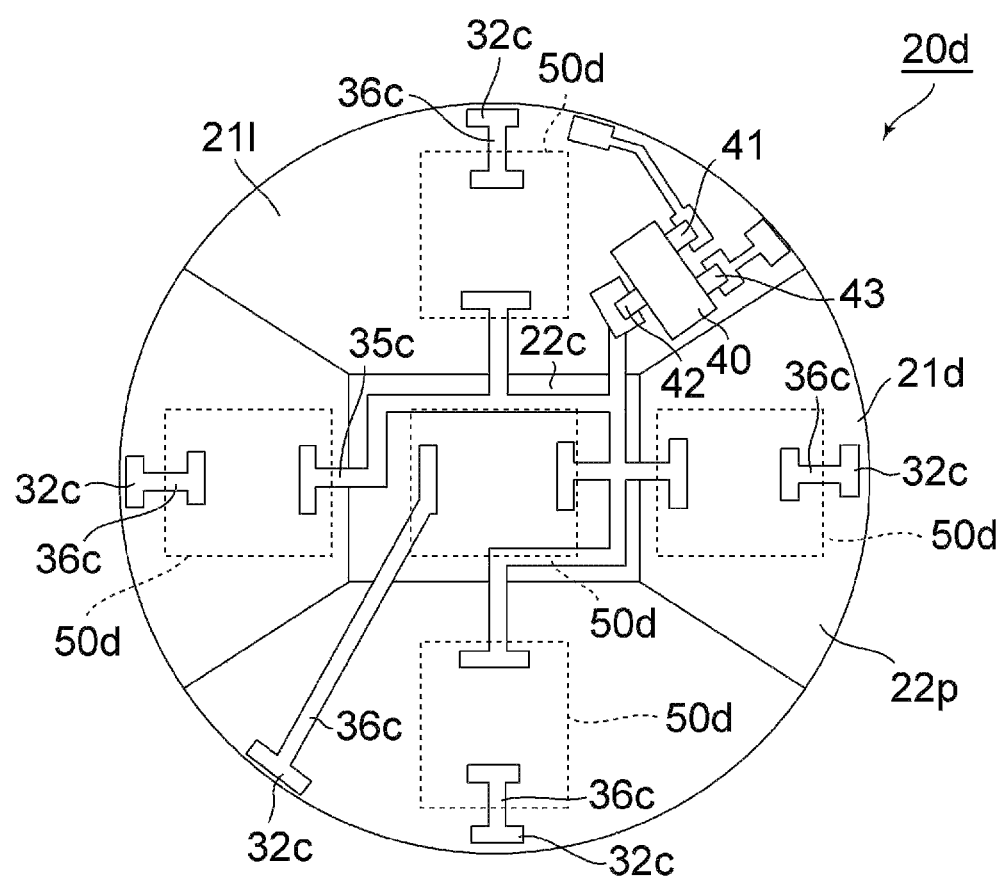
FIG. 16 is a bottom view showing the installation board of FIG. 15.

Similar to the above-mentioned second embodiment, the present embodiment can be modified so that its piercing-holes are replaced with depression portions. Specifically, as shown in FIGS. 15 and 16, an installation board 20d may be formed not with piercing-holes but with depression portions 53d. The depression portions 53d are depressed from an upper surface 21u toward a lower surface 21l of a substrate 21d in correspondence regions 50d, respectively. Because the depression portions 53d do not pierce the substrate 21d, the depression portions 53d are not shown in FIG. 16.

In every embodiments mentioned above, the connection between the pyroelectric element and the installation board uses the conductive adhesives 60 which include epoxy resin and have 4 B to 7 H, both inclusive, of pencil hardness as their hardness. Therefore, replacement of the pyroelectric element becomes easier.

The present application is based on a Japanese patent application of JP2010-213760 filed before the Japan Patent Office on Sep. 24, 2010, the contents of which are incorporated herein by reference.

While there has been described what is believed to be the preferred embodiment of the invention, those skilled in the art will recognize that other and further modifications may be made thereto without departing from the spirit of the invention, and it is intended to claim all such embodiments that fall within the true scope of the invention.

DESCRIPTION OF NUMERALS 10, 10a, 10b, 10c Pyroelectric element
11 Pyroelectric board
11u Upper Surface
11l Lower Surface
12 Upper Electrode
13, 14 Lower Electrode (Element Electrode)
20, 20a, 20b, 20c, 20d Installation Board
21, 21a, 21b, 21c, 21d Substrate
21u Upper Surface
21l Lower Surface
22p Peripheral Section
22c Central Section
23, 24 Upper Electrode (Board Electrode)
26, 27 Through-hole
31, 32, 32c, 33 Lower Electrode
34, 35, 35c, 36, 36c, 37 Conductive Trace
40 Field Effect Transistor (Semiconductor Amplifier Element)
41 Drain
42 Gate
43 Source
50, 50c, 50d Correspondence Region
51, 51c Piercing-hole
52, 52c Beam Portion
53, 53d Depression Portion
54 Conductive Member
60 Conductive Adhesive
70 Base
81, 82, 83 External Connection Pin
90, 90c Package
95, 95c Optical Filter
100, 100c Pyroelectric Type Infrared Detection Device
200 Spacer
220 Weight
240 Positioner
242 Support Portion
250 Control Plate

The invention claimed is:

1. A pyroelectric infrared detection device comprising:
a pyroelectric element; and
an installation board,
wherein:
the pyroelectric element comprises a pyroelectric board formed of a plate-like pyroelectric member and element electrodes;
the pyroelectric board has an upper surface and a lower surface;
the upper surface of the pyroelectric board is a reception surface for receiving an infrared light;
the element electrodes are formed on the lower surface of the pyroelectric board;
the installation board includes a substrate having an upper surface and a lower surface and board electrodes;
the board electrodes are formed on the upper surface of the substrate;
the element electrodes and the board electrodes are connected by a hardened conductive adhesive;
the hardened conductive adhesive is made of a mixture of an epoxy resin and an imidazole-based hardener or a silicone resin, whereon the epoxy resin is a bisphenol A epoxy resin, a bisphenol F epoxy resin or a phenol novolac epoxy resin; and
the hardened conductive adhesive has a pencil hardness of 4B to 7H, based on JIS k 5600-5-4 (ISO 15184).

2. The pyroelectric infrared detection device as recited in claim 1, wherein the installation board has a peripheral section and a central section; and wherein the central section is swelled upwards in comparison with the peripheral section.

3. The pyroelectric infrared detection device as recited in claim 1, wherein:
the installation board has a correspondence region corresponding to the pyroelectric element;
the board electrodes are formed within the correspondence region; and
the correspondence region is formed with piercing-holes piercing the installation board.

4. The pyroelectric infrared detection device as recited in claim 3, wherein:
a plurality of the piercing-holes are formed within the correspondence region; and
a beam portion is provided between the piercing-holes in the correspondence region.

5. The pyroelectric infrared detection device as recited in claim 1, wherein:
the installation board has a correspondence region corresponding to the pyroelectric element;
the board electrodes are formed within the correspondence region; and
the correspondence region is formed with a depression portion depressed downwards.

6. The pyroelectric infrared detection device as recited in claim 1, further comprising a semiconductor amplifier element,
wherein the semiconductor amplifier element is installed on the lower surface of the substrate, the lower surface of the substrate being a back side of the upper surface of the substrate; and
one of the board electrodes is coupled to the semiconductor amplifier element.

7. A method for replacing the pyroelectric element in the pyroelectric infrared detection device as recited in claim 1, the method comprising:
breaking the hardened conductive adhesive to take off the pyroelectric element;
removing trace amounts of the hardened conductive adhesive from the board electrodes; and
while interposing a new conductive adhesive between element electrodes of a new pyroelectric element and the board electrodes, hardening the new conductive adhesive to electrically connect the element electrodes of the new pyroelectric element and the board electrodes.

8. A method for replacing a pyroelectric element in a pyroelectric infrared detection device, the pyroelectric type infrared detection device comprising a pyroelectric element and an installation board, wherein:
the pyroelectric element comprises a pyroelectric board formed of a plate-like pyroelectric member and element electrodes;
the pyroelectric board has an upper surface and a lower surface;
the upper surface of the pyroelectric board is a reception surface for receiving an infrared light;
the element electrodes are formed on the lower surface of the pyroelectric board;

the installation board includes a substrate having an upper surface and a lower surface and board electrodes;

the board electrodes are formed on the upper surface of the substrate;

the element electrodes and the board electrodes are connected by a hardened conductive adhesive;

the hardened conductive adhesive includes an epoxy resin; and the hardened conductive adhesive has a pencil hardness of 4B to 7H, based on JIS k 5600-5-4(ISO 15184), the method comprising:

breaking the hardened conductive adhesive to take off the pyroelectric element;

removing trace amounts of the hardened conductive adhesive from the board electrodes; and while interposing a new conductive adhesive between element electrodes of a new pyroelectric element and the board electrodes, hardening the new conductive adhesive to electrically connect the element electrodes of the new pyroelectric element and the board electrodes.

\* \* \* \* \*